United States Patent [19]
Takahashi et al.

[11] Patent Number: 5,897,392
[45] Date of Patent: Apr. 27, 1999

[54] WIRE RETAINING CLIP

[75] Inventors: Takeshi Takahashi, Novi; Jeromy William Tomlin, Berkley; Jerome Adam David Duhr, Plymouth, all of Mich.

[73] Assignee: Yazaki Corporation, Tokyo, Japan

[21] Appl. No.: 08/824,043

[22] Filed: Mar. 26, 1997

[51] Int. Cl.[6] .................................................. H01R 13/58
[52] U.S. Cl. ........................ 439/470; 439/467; 429/121
[58] Field of Search ............................. 429/121; 439/456, 439/459, 460, 465–471, 371, 273

[56] References Cited

U.S. PATENT DOCUMENTS

| | | | |
|---|---|---|---|
| 5,315,062 | 5/1994 | Hoshino | 439/466 |
| 5,586,909 | 12/1996 | Saba | 439/273 |
| 5,643,693 | 7/1997 | Hill et al. | 429/121 |
| 5,700,156 | 12/1997 | Bussard et al. | 439/471 |

*Primary Examiner*—Neil Abrams
*Assistant Examiner*—Brian J. Biggi
*Attorney, Agent, or Firm*—Young & Basile, P.C.

[57] ABSTRACT

A wire retaining clip for guiding bundled wires extending from an electrical connector mounted to a power distribution box and securing the wires to the box to prevent vibration of the wires from causing them to separate from their terminals. The wire retaining clip is molded in a single piece and comprises a connector cover which snaps into attachment with the electrical connector to secure the wire terminals therein and a wire guide member attached to the cover by a living hinge. The wire guide member encloses the wires and routes them around an edge of the power distribution box and along a second surface of the box. The wires are taped or otherwise secured to the wire guide member, and a lock mechanism on the wire guide member engages cooperating means on the power distribution box to secure the wires to the box.

23 Claims, 3 Drawing Sheets

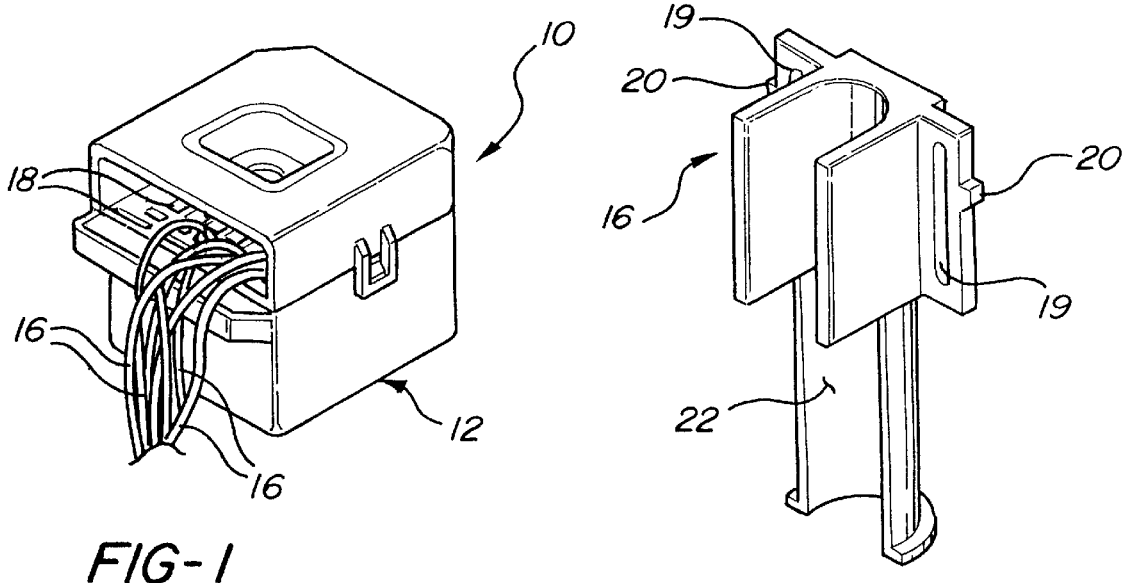
FIG-1 PRIOR ART
FIG-2 PRIOR ART
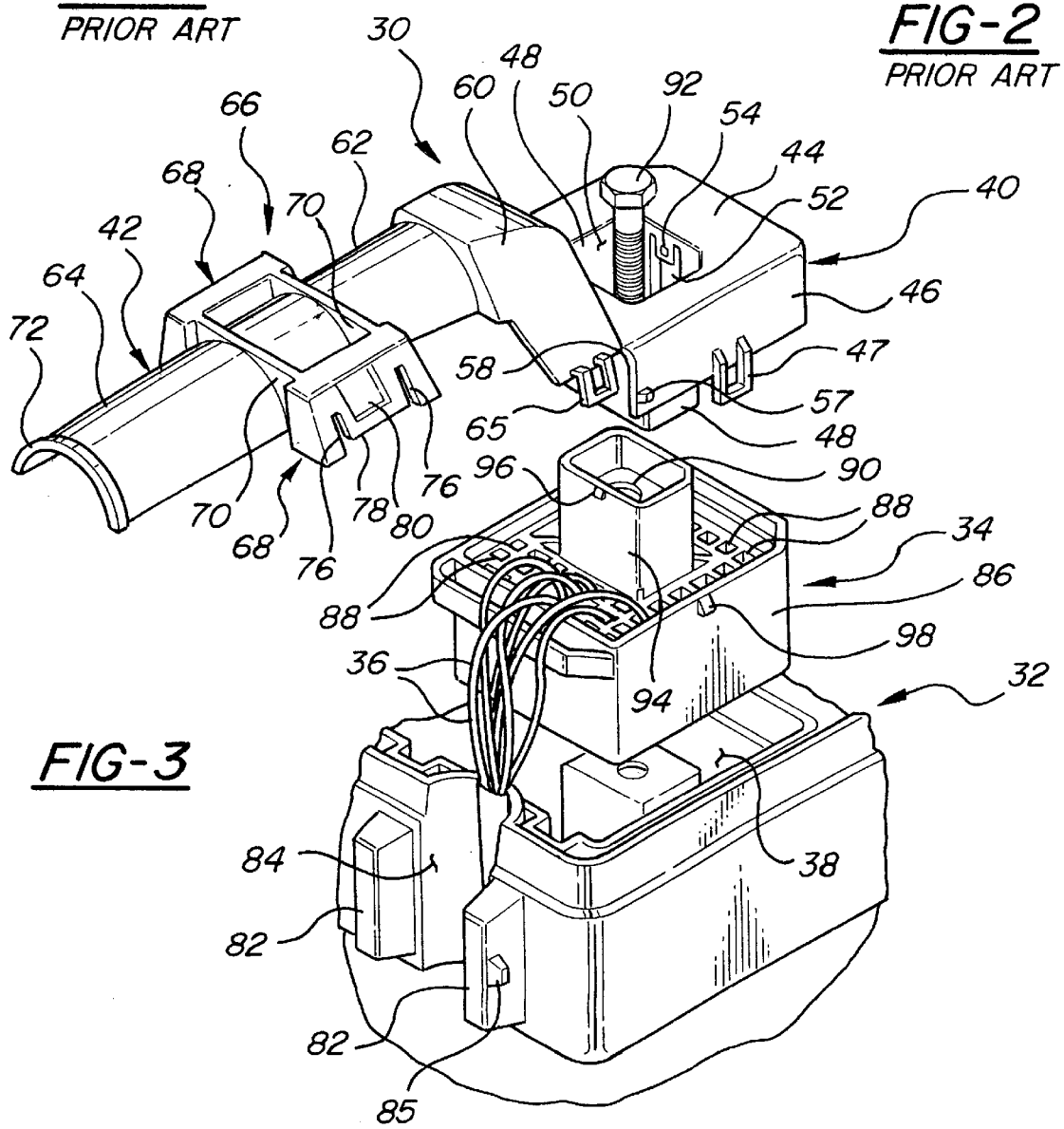
FIG-3

WIRE RETAINING CLIP

FIELD OF THE INVENTION

This invention relates in general to electrical power distribution boxes and connectors matable therewith, and more specifically to a combined cover and wire guide member for preventing vibration of wires attached to terminals housed by a connector.

BACKGROUND OF THE INVENTION

Power distribution boxes (PDBS) are commonly used in automotive vehicles to simplify electrical system wiring by eliminating multi-branch wiring and consolidating fuses, relays, and other electrical components in a single location. A PDB typically comprises a housing having a plurality of integrally formed external receptacles for receiving electrical connectors, fuses, relays, and other components. The electrical connectors which plug into the receptacles terminate wire harnesses which extend from the PDB to connect with various electrical systems throughout the vehicle. Terminals on the ends of the wires making up a wire harness are held in internal chambers formed in the electrical connector so as to make electrical contact with mating terminals within the PDB when the connector is inserted into its receptacle.

It is known to fasten a cover over the otherwise open top surface of the connector which receives the terminals, the cover serving to prevent the terminals from inadvertently being dislodged from their respective chambers by vibration or by tension on the wires. The cover also serves to prevent a tool used to bolt the connector to the receptacle, such as an air ratchet, from inadvertently becoming entangled in the wires and damaging the wires. Such a cover is indicated by reference numeral 10 in FIG. 1, the cover shown operatively attached to an electrical connector 12. Terminals (not shown) are crimped to the ends of wires 16 and are retained in chambers 18 extending through the connector, the wires being forced to make a right-angled bend and extend horizontally out the open end of cover 10 when the cover is snapped into engagement with the connector.

In some automotive PDB installations, space constraints and electrical system requirements result in a wiring layout wherein the bundled wires of a wiring harness extend from an electrical connector mated with a receptacle on a first surface of the PDB and must then make a sharp turn around the edge or corner of the PDB to be routed along a second surface of the PDB. It is known to use a clip 16, as shown in FIG. 2, to secure the wires to the second surface of the PDB along which they extend. The wires (not shown) are routed to lie in the concave side of a trough 22 which extends along clip 16 and are secured therein by wrapping tape (not shown) around the trough and wires. The back side of clip 16 lies against the second surface of the PDB and is connected thereto by means of slots 19 and detent tabs 20 which engage mating means on the PDB.

It has been found that during operation of an automotive vehicle, engine vibrations are transmitted through the wires of the wiring harness and sometimes cause mechanical failure of the wires or the joints between the wires and their respective terminals within the electrical connector. While the prior art connector cover 10 discussed hereinabove prevents the wires and attached terminals from being dislodged from the electrical connector, it does not adequately restrain the wires against vibration parallel to the surface of the cover and perpendicular to the axes of the terminals. Neither does the wire clip 16 discussed hereinabove effectively suppress this mode of vibration, which is believed to cause failure of the wires at or near the wire/terminal interface.

Even when the prior art connector cover and wire guide clip are used in combination, the portions of the wire harness extending between the connector cover and the wire guide clip are exposed and so are prone to being damaged or contaminated in that area.

SUMMARY OF THE INVENTION

It is an object of the present invention to restrain wires extending from a connector against vibration and so prevent the wires from becoming detached from their respective terminals.

It is another object of this invention to guide a wire bundle extending from a connector along a desired path over the surfaces of a power distribution box (PDB) and protect the wire bundle from possible damage and contamination.

It is a further object of this invention to provide a wire retaining clip that may be easily and quickly installed in its operative position in connection with a connector and PDB.

In general, the above objectives are achieved by the provision of a one-piece wire retaining clip which covers and secures the terminals within the connector, guides the wires extending from the connector along the surfaces of the PDB, and secures the wires to the PDB to substantially prevent vibration of the wires relative to the PDB and connector at their ends which connect to the terminals.

In the preferred embodiment of the invention disclosed herein, the wire retaining clip comprises two portions: a cover which attaches to a connector mated with a receptacle on a first surface of the PDB and retains the wire terminals within the connector, and an integrally formed wire guide member which extends along a second surface of the PDB. The wire guide member extends substantially perpendicularly to the cover and guides the wires of the harness around a corner between the first and second surfaces of the PDB. The wire guide member has means for securing the wire guide member to the PDB when the cover is attached to the connector and the connector is mounted to the PDB. The wire guide member substantially encloses the wires and routes them along the second surface of the PDB, and when the wires are secured to the wire guide member by tape or similar means, the wires are restrained so that any vibration being transmitted through the wires will not be applied to the junction between the wires and their respective terminals. Accordingly, the wire retaining clip reduces the likelihood of vibration-induced failure of the connections between the wires and their respective terminals.

Also according to the preferred embodiment, the wire guide member comprises a transition segment which directs the wire harness around the corner separating the first and second surfaces of the PDB and tapers from a first width approximately equal to the width of the cover to a smaller second width. A semi-tubular trough extends from the narrower end of the transition segment, the concave side of the trough facing toward the side of the PDB when the wire retaining clip, the connector and the PDB are operatively assembled. Preferably, the transition segment is attached to the cover by a living hinge. The transition segment and trough substantially enclose the wire bundle to protect the wires from damage and contamination and guide the wires along the desired routing along the side of the PDB.

Latching means for securing the wire guide member to the PDB comprises at least one latch housing formed integrally with the wire guide means for receiving a complimentary lock projection disposed on the side of the PDB, the housing and lock projection snapping into engagement with one another when the wire guide member is in its operative position with respect to the PDB.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts through the several views, and wherein:

FIG. 1 is a perspective view of a prior art connector and connector cover;

FIG. 2 is a perspective view of a prior art wire guide clip;

FIG. 3 is an exploded view of a wire retaining clip according to the present invention along with a power distribution box and electrical connector;

DETAILED DESCRIPTION OF THE PREFERRED EMBODIMENT

Figure 4:
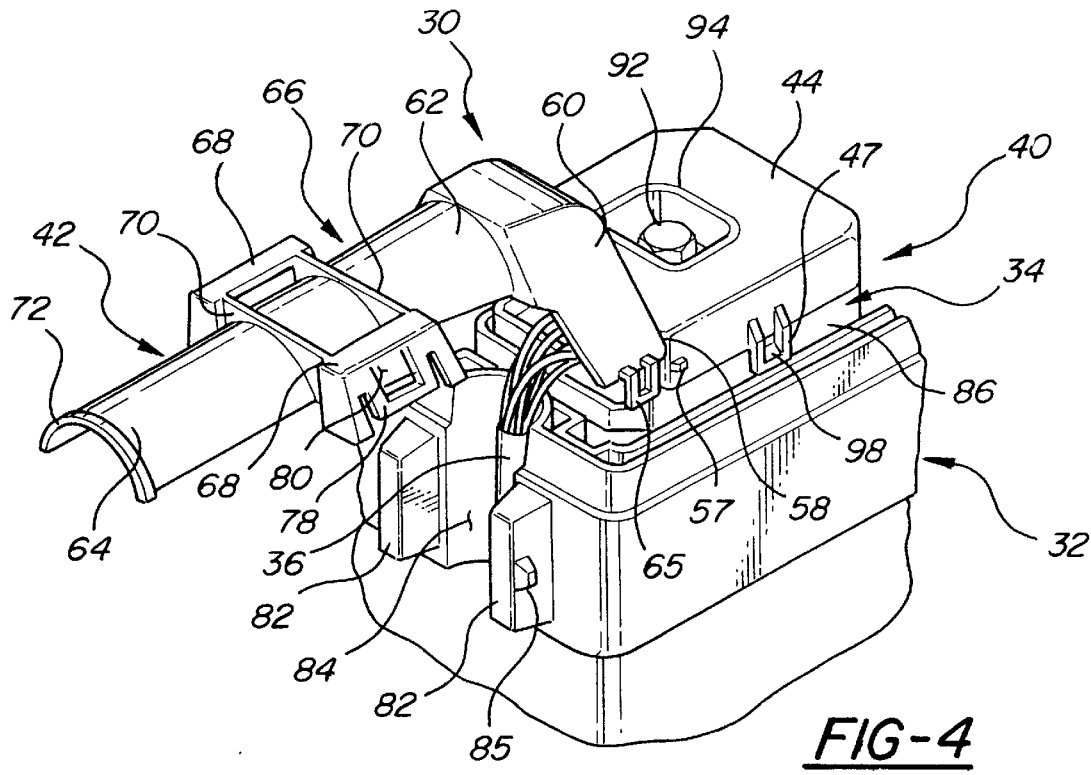
FIG. 4 is a perspective view of the components of FIG. 3 in a partially assembled configuration.
Figure 5:
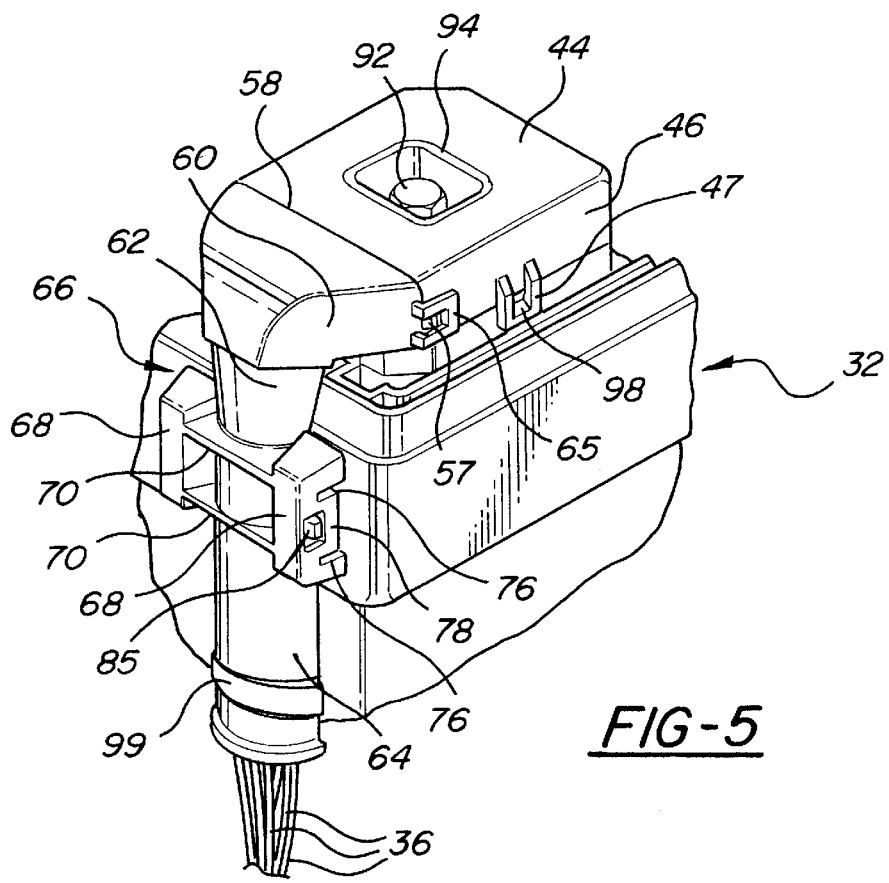
FIG. 5 is a perspective view of the components of FIG. 3 in a fully assembled configuration.

As seen in FIGS. 3–5, a wire retaining clip 30 according to the present invention is used in conjunction with a power distribution box (PDB) 32 and an electrical connector 34. The electrical connector 34 terminates a plurality of wires 36, such as make up a wiring harness, and is matingly retained in a receptacle 38 formed in the top surface of the PDB to provide for electrical contact between the wires 36 and electrical circuitry (not shown) within the PDB.

Wire retaining clip 30 is preferably formed of a thermoplastic material such as polypropylene and comprises a connector cover 40 and a wire guide member 42 hingingly attached to the cover. The connector cover 40 snaps into attachment with the electrical connector 34 (as depicted in FIGS. 3 and 4) to secure wire terminals (not shown) therein. When the electrical connector 34 is inserted into receptacle 38 (see FIGS. 4 and 5), the wire guide member 42 encloses the wires 36 extending from the terminals and snaps into engagement with the PDB 32, as shown in FIG. 5, to restrain the wires 36 against vibration.

Connector cover 40 comprises a substantially rectangular upper surface 44 having a skirt 46 extending downwardly therefrom along three of its sides, wire guide member 42 being attached to the edge of the upper surface along the remaining, open side of the cover. A latch tab 47 extends downwardly from skirt 46 approximately midway along each of two opposite sides of the skirt, and a latch bump 57 projects outwardly from each of the same two skirt sides at the ends of the skirt adjacent the open side of the cover. A substantially rectangular inner tube 48 extends downwardly from upper surface 44 to define a central channel 50 passing through the connector cover 40. Inner tube 48 has a vertically extending slot 52 formed in each of two opposite sides thereof, each slot defining a flexible tab 54 immediately adjacent top surface 44.

The wire guide member 42 is preferably molded integrally with connector cover 40, the two portions being connected by a narrow band of material of reduced thickness known in the art as a living hinge 58. Living hinge 58 is thin enough to be flexible and so permit the cover 40 and wire guide member 42 to rotate relative to one another about the hinge line. Wire guide member 42 comprises a transition segment 60 which tapers from a first width adjacent living hinge 58 to a narrower width distal from the hinge, a half-funnel portion 62 integral with the transition segment and extending from the narrower end thereof, and a half-circular trough 64 extending from the smaller end of the half-funnel. A retaining tab 65 is formed on either side of the transition segment 60 adjacent the living hinge 58. A lip 72 extends slightly outward from the convex side of the lower end of trough 64.

Living hinge 58 permits wire retaining clip 30 to be injection molded in the substantially flat configuration shown in FIG. 3, then rotated to the right-angled configuration shown in FIG. 5 for attachment to the PDB 32. The wire retaining clip 30 is molded in the substantially flat configuration shown in FIG. 3 in order to reduce the draw depth of the molding die (not shown) used to produce the part. A small die draw depth is, as is well known in the art, an important consideration in improving the manufacturability of an injection molded part.

A self-centering lock mechanism 66 is disposed on trough 64 adjacent the half-funnel 62. Lock mechanism 66 takes the form of two slightly tapered, generally rectangular latch housings 68, one on either side of trough 64 and connected by a pair of stiffening flanges 70 extending across the trough. Each latch housing 68 comprises a box comprised of five thin walls, the side of the box facing in the same direction as the convex side of the trough 64 (that is, the side facing downwardly in FIG. 3 and toward PCB 32 in FIG. 5) being open. The outwardly facing side of each latch housing 68 has a pair of spaced slits 76 extending inwardly from the edge thereof, the slits defining therebetween a tab 78 with a rectangular aperture 80 passing therethrough.

Lock mechanism 66 is configured to mate with a pair of lock projections 82 formed on PDB 32 as shown in FIG. 5. The lock projections 82 are disposed on opposite sides of a concave channel 84 extending vertically along the surface of the PDB 32 immediately adjacent receptacle 38. Each lock projection 82 is an elongated, slightly tapered rectangular prism and has a detent pawl 85 in the form of a truncated pyramid projecting from the outward facing surface thereof.

As best seen in FIG. 3, electrical connector 34 is of a general type well known in the automotive wiring harness art, comprising a substantially rectangular body 86 with a plurality of internal chambers 88 for receiving wire terminals. The chambers 88 are disposed in surrounding relationship to a substantially square wall 94 which extends upwardly at the center of body 86. A hole 90 located inside of wall 94 and passing completely through body 86 permits a bolt 92 to be inserted to secure the connector in place within receptacle 38. Small detent bumps 96 project outwardly on opposite sides of wall 94 adjacent its upper edge, and a larger pair of detent bumps 98 are formed on opposite lateral sides of the body 86 adjacent the upper surface thereof.

The wire retaining clip 30 may be connected to the wiring connector 34 either prior to or after the connector is inserted into receptacle 38 in PDB 32. The wire retaining clip 30 is attached to the electrical connector 34 by positioning cover 40 over the open upper surface of the wiring connector and urging the cover downward with respect thereto. The inner tube 48 of cover 40 passes downwardly around the exterior of wall 94 and latch tabs 47 snap over detent bumps 98 to secure the cover in place. Latch bumps 96 also snap into engagement with apertures in flexible tabs 54 to further secure cover 40 to connector 34.

The connection between cover 40 and electrical connector 34 is preferably made while wire guide member 42 is in an upwardly hinged position as shown in FIG. 3. Wires 36 leading from the connector may then be gathered together into a bundle, pressed upwardly into the concave underside of the wire guide member 42 and secured in place by wrapping tape 99 or the equivalent around the distal end of trough 64. Lip 72 reduces the likelihood that tape 99 will slide downwardly off of trough 64 should its adhesive grip on the trough weaken.

Next, wire guide member 42 is rotated about living hinge 58 toward a vertical position so that retaining tabs 65 on transition segment 60 snap over the latch bumps 57 on connector cover 40 and lock mechanism 66 engages lock projections 82 on PDB 32. This engagement is achieved as each latch housing 68 passes over its respective lock projection 82 and tab 78 is deflected outwardly by contact with detent pawl 85. When latch housings 68 have passed completely over lock projections 82, tabs 78 snap back such that detent pawls 85 project through apertures 80 as shown in FIG. 5.

When wire retaining clip 30 is attached to electrical connector 34 and to PDB 32 in the manner shown in FIG. 5, wires 36 extending from the electrical connector are completely enclosed and securely restrained against vibration. Transition segment 60 guides the wires 36 around the edge of PDB 32 as they make the 90° bend to extend down along the vertical side of the PDB, and the wire bundle is routed along channel 84 and maintained therein by wire guide member 42. The secure engagement between locking mechanism 66 and lock projections 82 combines with the taping of wires 36 to trough 64 to substantially prevent vibrations propagating along the wires from being transmitted to the wire/terminal junction where it might cause failure of the connection.

Figure 6:
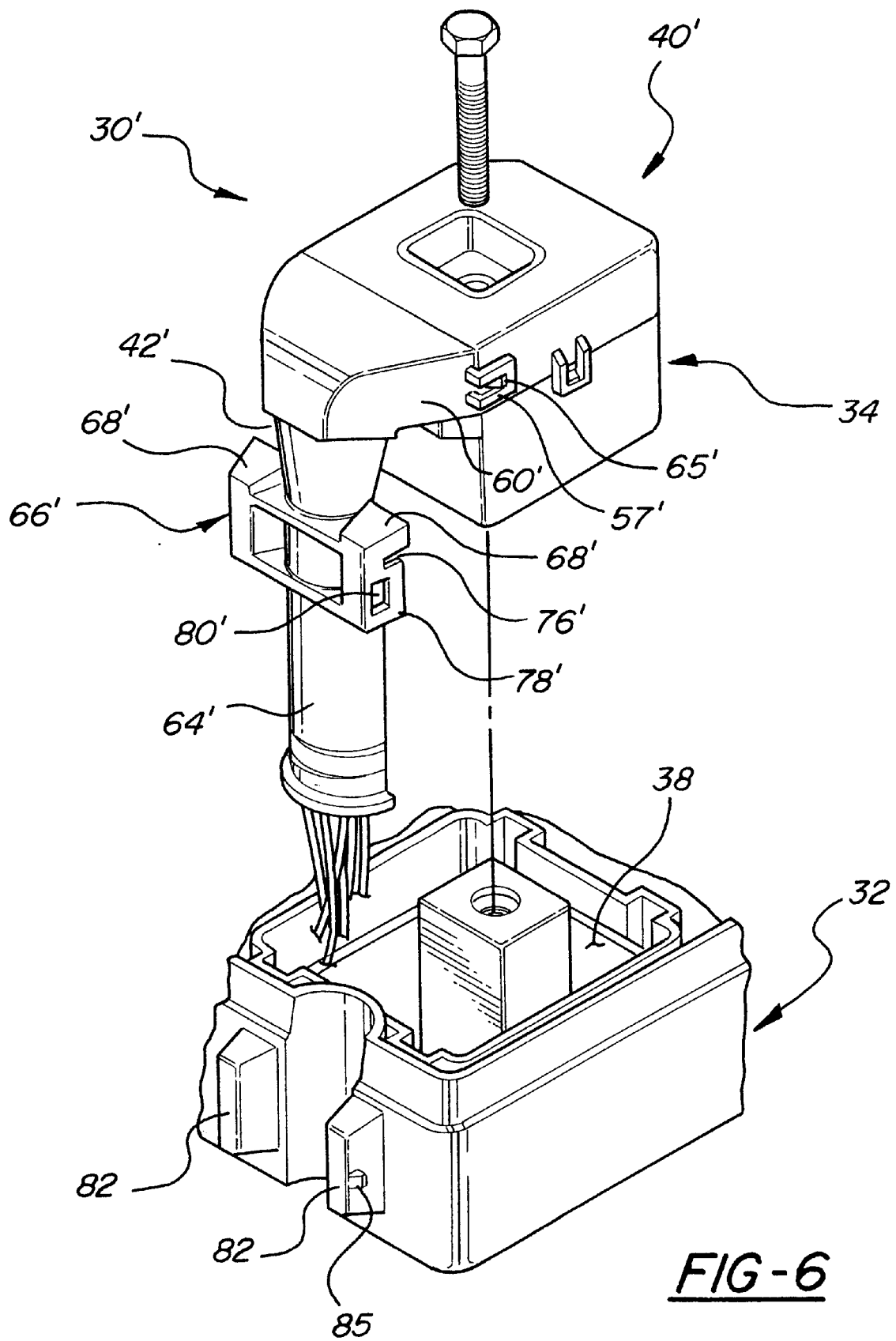
FIG. 6 is a perspective view of an alternative embodiment of the invention wire guide clip secured to the electrical connector and prior to attachment to the power distribution box.

In a second embodiment of the invention shown in FIG. 6, wire retaining clip 30' has a lock mechanism 66' differing from that described above in that the latch housings 68' are four-sided boxed, the lower-most end of each latch housing being open in addition to the back side. A single slit 76' extending inwardly from the edge of the outwardly facing side defines a tab 78' having an aperture 80' passing therethrough.

In this embodiment, connector cover 40' may be attached to electrical connector 34 and wire guide member 42' rotated downwardly to the right-angled position prior to the electrical connector being inserted into receptacle 38. Because the lower-most ends of latch housings 68' are open, the latch housings are able to slide end-wise over lock projections 82 as electrical connector 34 is inserted into receptacle 38 and trough 64' passes between the lock projections. When the components are assembled in this manner, the lower edges of retaining tabs 78' contact the upward facing surfaces of detent pawls 85 and are deflected outwardly to ride over the bumps, snapping back such that the detent pawls project through apertures 80'. Wire retaining clip 30' may also be assembled to the electrical connector and PDB in the manner described hereinabove in relation to the first embodiment of the invention.

Whereas a preferred embodiment of the invention has been illustrated and described in detail, it will be apparent that various changes may be made in the disclosed embodiment without departing from the scope or spirit of the invention.

The invention claimed is:

1. A wire retaining clip for use with a power distribution box (PDB) having a first surface and a non-parallel second surface and an electrical connector mountable to the first surface of the PDB, the connector having a plurality of wire terminals therein and a plurality of wires attached to the terminals and extending from the connector, the clip comprising:

a cover attachable to the connector to retain the plurality of wire terminals in engagement with the connector; and a wire guide member joined to the cover for guiding the wires along the second surface of the PDB and having means for securing the wire guide member to the second surface of the PDB.

2. A clip according to claim 1 wherein the wire guide member comprises means for redirecting the wires from a first path substantially parallel with the first surface to a second path substantially parallel with the second surface.

3. A clip according to claim 1 wherein the wire guide member comprises a trough for receiving the wires, the trough extending from the cover so as to present a concave side of the trough to the second surface of the PDB when the wire guide member is secured to the second surface of the PDB.

4. A clip according to claim 3 for mounting to a PDB having a channel formed in the second surface thereof, the clip mountable to the PDB to place the trough in alignment with the channel when the cover is attached to the connector and the connector is mounted to the first surface of the PDB.

5. A clip according to claim 3 wherein the cover is of a first width and the trough is of a second width smaller than the first width, and the wire guide member comprises a transition segment tapering between the first width and the second width.

6. A clip according to claim 1 wherein the wire guide member is formed integrally with the cover and is connected thereto by a living hinge.

7. A clip according to claim 6 further including means for maintaining the wire guide member in a desired orientation about the living hinge with respect to the cover.

8. A clip according to claim 1 wherein the means for securing the wire guide member to the PDB comprises latching means disposed on the wire guide member and detachably matable with complementary latching means disposed on the PDB.

9. A clip according to claim 8 wherein the latching means is formed integrally with the wire guide member.

10. A clip according to claim 8 wherein the latching means comprises at least one latch housing disposed on the wire guide member and adapted to receive the complementary latching means.

11. A clip according to claim 10 wherein the latch housing comprises a side wall having an aperture formed therein for receiving therethrough a pawl disposed on a ridge insertable into the latch housing, the ridge and pawl constituting the complementary latching means.

12. In combination:

a power distribution block (PDB) having a first surface and a nonparallel second surface;

an electrical connector mountable to the first surface of the PDB and containing a plurality of wire terminals with wires extending therefrom; and a wire retaining clip comprising a cover attachable to the connector to retain the wire terminals in engagement with the connector, and a wire guide member joined to the cover and having means for securing the wire guide member to the second surface of the PDB when the cover is attached to the connector and the connector is mounted to the first surface of the PDB.

13. Apparatus according to claim 12 wherein the wire guide member is formed integrally with the cover and is connected thereto by a living hinge.

14. Apparatus according to claim 13 further including means for maintaining the wire guide member in a desired orientation about the living hinge with respect to the cover such that the cover is aligned with the first surface of the PDB and the wire guide member is aligned with the second surface of the PDB.

15. Apparatus according to claim 14 wherein the first and second surfaces of the PDB are substantially perpendicular to one another and the desired orientation is such that the wire guide member extends substantially perpendicularly from the cover.

16. Apparatus according to claim 12 wherein the wire guide member comprises a trough extending along the second surface of the PDB when the cover is attached to the connector and the connector is mounted to the first surface of the PDB.

17. Apparatus according to claim 16 wherein the second surface of the PDB has a channel formed therein and a concave side of the trough is in parallel alignment with the channel when the cover is attached to the connector and the connector is mounted to the PDB.

18. Apparatus according to claim 16 wherein the cover is of a first width and the trough is of a second width smaller than the first width, and the wire guide member further comprises a transition segment tapering between the first width and the second width.

19. Apparatus according to claim 18 wherein the transition segment comprises means for redirecting the wires from a first path substantially parallel with the first surface to a second path substantially parallel with the second surface.

20. Apparatus according to claim 13 wherein the means for securing the wire guide member to the PDB comprises at least one latch housing disposed on the wire guide member and detachably connectable with at least one ridge disposed on the PDB and insertable into the latch housing.

21. Apparatus according to claim 20 wherein the latch housing comprises a side wall having an aperture formed therein for receiving therethrough a pawl disposed on the ridge.

22. A wire retaining clip for use with a power distribution box (PDB) and an electrical connector mountable to a first surface of the PDB, the connector having a plurality of wire terminals therein and a plurality of wires attached to the terminals and extending from the connector, the clip comprising:

a cover attachable to the connector to retain the plurality of wire terminals in engagement with the connector; and a wire guide member for guiding the wires along a second surface of the PDB, the second surface being nonparallel to the first surface, the wire guide member having means for securing the wire guide member to the second surface and means joined to the cover for guiding the wires around a juncture of the first and second surfaces.

23. A wire retaining clip according to claim 22 wherein the cover, wire guide member and guiding means are integrally formed.

\* \* \* \* \*